(12) United States Patent
Rheinschmitt et al.

(10) Patent No.: US 11,297,665 B2
(45) Date of Patent: Apr. 5, 2022

(54) METHOD FOR MANAGING A CELLULAR RADIO COMMUNICATIONS NETWORK, A MANAGEMENT DEVICE, A METHOD TO OPERATE A FIRST RADIO DEVICE, A FIRST RADIO DEVICE, A METHOD TO OPERATE A SECOND RADIO DEVICE, AND A SECOND RADIO DEVICE

(71) Applicant: NOKIA TECHNOLOGIES OY, Espoo (FI)

(72) Inventors: Rupert Rheinschmitt, Stuttgart (DE); Rolf Fuchs, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/470,151

(22) PCT Filed: Dec. 7, 2017

(86) PCT No.: PCT/EP2017/081777
§ 371 (c)(1),
(2) Date: Jun. 14, 2019

(87) PCT Pub. No.: WO2018/108683
PCT Pub. Date: Jun. 21, 2018

(65) Prior Publication Data
US 2019/0380160 A1    Dec. 12, 2019

(30) Foreign Application Priority Data
Dec. 15, 2016    (EP) ..................................... 16204411

(51) Int. Cl.
*H04W 76/14*    (2018.01)
*H04W 76/15*    (2018.01)
(Continued)

(52) U.S. Cl.
CPC ......... *H04W 76/14* (2018.02); *H04W 36/026* (2013.01); *H04W 36/03* (2018.08);
(Continued)

(58) Field of Classification Search
CPC ..... H04W 76/14; H04W 76/15; H04W 36/03; H04W 36/305; H04W 36/026; H04W 72/048
See application file for complete search history.

(56) References Cited

U.S. PATENT DOCUMENTS

2012/0120892 A1    5/2012   Freda et al.
2013/0287012 A1*  10/2013   Pragada ................ H04W 76/22
                                                            370/338
(Continued)

FOREIGN PATENT DOCUMENTS

WO        2015147618 A1    10/2015

OTHER PUBLICATIONS

International Search Report and Written Opinion for International Application No. PCT/EP2017/081777, dated Jan. 26, 2018, 12 pages.
(Continued)

*Primary Examiner* — Dady Chery
(74) *Attorney, Agent, or Firm* — Brake Hughes Bellermann LLP (57) ABSTRACT

A method for managing a cellular radio communications network is proposed. The method comprises: receiving (102) a plurality of numerology capability indications from a plurality of radio devices, wherein a numerology capability indication comprises one or more direct-link block lengths for communicating via a physical direct-link radio channel; receiving a plurality of cell indications, wherein the cell indication indicates in which radio cell the respective radio device is operating; determining an instruction mes-
(Continued)

sage in dependence on the numerology indications of the first and second radio device and in dependence on the cell indication of the first and second radio device; and transmitting the instruction message towards at least one of the first and second radio devices.

15 Claims, 9 Drawing Sheets (51) Int. Cl.
    *H04W 36/00*     (2009.01)
    *H04W 36/30*     (2009.01)
    *H04W 36/02*     (2009.01)
    *H04W 72/04*     (2009.01)

(52) U.S. Cl.
    CPC ....... *H04W 36/305* (2018.08); *H04W 72/048* (2013.01); *H04W 76/15* (2018.02)

(56) References Cited

U.S. PATENT DOCUMENTS

2013/0324114 A1    12/2013    Raghothaman et al.
2014/0192637 A1    7/2014    Ou
2014/0348081 A1    11/2014    Liao

OTHER PUBLICATIONS

Office Action for European Application No. 16204411.9, dated Jun. 2, 2020, 6 pages.

* cited by examiner

METHOD FOR MANAGING A CELLULAR RADIO COMMUNICATIONS NETWORK, A MANAGEMENT DEVICE, A METHOD TO OPERATE A FIRST RADIO DEVICE, A FIRST RADIO DEVICE, A METHOD TO OPERATE A SECOND RADIO DEVICE, AND A SECOND RADIO DEVICE

CROSS-REFERENCE TO RELATED APPLICATIONS

This application is a national stage entry of International Application No. PCT/EP2017/081777, filed Dec. 7, 2017, entitled "A METHOD FOR MANAGING A CELLULAR RADIO COMMUNICATIONS NETWORK, A MANAGEMENT DEVICE, A METHOD TO OPERATE A FIRST RADIO DEVICE, A FIRST RADIO DEVICE, A METHOD TO OPERATE A SECOND RADIO DEVICE, AND A SECOND RADIO DEVICE" which claims the benefit of priority of EP 16204411.9, filed Dec. 15, 2016, both of which are hereby incorporated by reference in their entireties.

FIELD OF THE INVENTION

The present disclosure is directed to a method for managing a cellular radio communications network, a management device, a method to operate a first radio device, a first radio device, a method to operate a second radio device, and a second radio device.

BACKGROUND

Evolving radio communications standards like 5G permit an efficient multi-cell/multi-TP (transmission point) support of mixed numerologies, namely mixed carrier configurations. 5G in general and specifically 3GPP New Radio targets multi-service support within one carrier. As the different service use cases are very different from each other, they motivate different multi-carrier waveform parameters each.

SUMMARY

One aspect of this disclosure is directed to a method for managing a cellular radio communications network, the method comprising: receiving a plurality of numerology capability indications from a plurality of radio devices, wherein a numerology capability indication comprises one or more direct-link block lengths for communicating via a physical direct-link radio channel; receiving a plurality of cell indications, wherein the cell indication indicates in which radio cell the respective radio device is operating; determining an instruction message in dependence on the numerology indications of the first and second radio device and in dependence on the cell indication of the first and second radio device; and transmitting the instruction message towards at least one of the first and second radio devices.

Therefore, the network infrastructure devices for operating the cellular radio communications network are able to exploit the information of the numerology capability indications and the cell indications to instruct the radio devices about how to communicate with each other. Therefore, the method provides to control the transmission between the radio devices via the physical direct-link radio channel by means of the backbone network.

By providing direct-link block lengths, the network provider is able to shift data traffic from and/to physical direct-link radio channels between radio devices. This offers a reduced delay due to smaller block lengths for modulation/demodulation. Moreover, data travels through less radio network infrastructure devices while data speed and data reliability is higher.

By centralising the procedure to determine instruction messages any discovery protocol comprising broadcasting or probing for a direct link between radio devices is not necessary. Therefore, communication overhead in the radio cells is avoided.

The cell indications may provide information about the distance between the respective radio devices. Especially, the information that two radio devices reside in adjacent cells, the same cell or in overlapping cells such as a pico-cell being provided inside another radio cell, can beneficially exploited to determine the instruction message.

Another advantage is that the radio network infrastructure devices like base stations or the like do not necessarily need to support an OFDM-modulation and -demodulation with different block lengths. Only one or more control channels to transmit the instruction messages and receive the numerology indications and cell indications have to be provided.

According to an advantageous embodiment the method comprises: determining that the first and second radio devices offer identical direct-link block lengths and determine in dependence on the cell indication that the first and second radio devices are located close enough for establishing a physical direct-link radio channel; and determining the instruction message for the first device to transmit data on the physical direct-link radio channel towards the second radio device.

A physical direct-link radio channel can be established without passing data through the radio network infrastructure devices, because a control link goes via the radio network infrastructure devices. Consequently, network load can be transferred from the radio network infrastructure devices to the physical direct-link radio channel. Moreover, a connection to the radio network infrastructure is still available, so communication with an IP core network is still possible.

According to an advantageous embodiment the method comprises: determining a signalling path between the first and second radio device through a radio network infrastructure device; determining a further instruction message for the first and/or second radio device to transmit data via the signalling path; and transmitting the further instruction message to at least one of the first and second radio devices.

Advantageously the signalling path represents a failover path if the physical direct-link radio channel is not available.

According to an advantageous embodiment the method comprises: receiving a notification from the first or second radio device that the physical direct-link radio channel is malfunctioning; determining and transmitting the further instruction message to at least one of the first and second radio devices as a response to the notification.

Therefore, upon determining a malfunction of the physical direct-link radio channel the failover path according to the signalling path can be activated.

According to an advantageous embodiment the method comprises: determining an unavailable direct-link capability if it is determined that the first and second radio devices do not offer identical direct-link block lengths or if it is determined in dependence on the cell indication that the first and second radio devices are not located close enough for establishing the physical direct-link radio channel; and determine and transmit the further instruction message to at least one of the first and second radio devices if the unavailable direct-link capability is determined.

This determination scheme advantageously enables the radio network provider to establish physical direct-link radio channels where possible.

A further aspect of the description is directed to a management device, the management device comprising a processor, a memory and a network interface being configured to: receive a plurality of numerology capability indications from a plurality of radio devices, wherein a numerology capability indication comprises one or more direct-link block lengths for communicating via a physical direct-link radio channel; receive a plurality of cell indications, wherein the cell indication indicates in which radio cell the respective radio device is operating; determine an instruction message in dependence on the numerology indications of the first and second radio device and in dependence on the cell indication of the first and second radio device; and transmit the instruction message towards at least one of the first and second radio devices.

Another aspect of the description is directed to a method to operate a first radio device for operating in a cellular radio communications network, the method comprising: determining a numerology capability indication, the numerology capability indication comprising one or more direct-link block lengths for communicating via a physical direct-link radio channel; transmitting the numerology capability indication via a physical uplink radio channel to a management device; determining data to be transmitted to a second radio device; receiving an instruction message via a physical downlink radio channel from the management device; transmitting the data towards the second radio device in dependence on the instruction message.

Another aspect of the description is directed to a method to operate a second radio device for operating in a cellular radio communications network, the method comprising: determine a numerology capability indication, the numerology capability indication comprising one or more direct-link block lengths for communicating via a physical direct-link radio channel; transmit the numerology capability indication via a physical uplink radio channel to a management device; receive an instruction message via a physical downlink radio channel from a management device; receive the data from the first radio device in dependence on the instruction message.

Another aspect of the description is directed to a second radio device for operating in a cellular radio communications network, the second radio device comprising a processor, a memory and an antenna being configured to: determine a numerology capability indication, the numerology capability indication comprising one or more direct-link block lengths for communicating via a physical direct-link radio channel; transmit the numerology capability indication via a physical uplink radio channel to a management device; receive an instruction message via a physical downlink radio channel from a management device; receive the data from the first radio device in dependence on the instruction message.

DESCRIPTION OF THE EMBODIMENTS

Figure 1A:
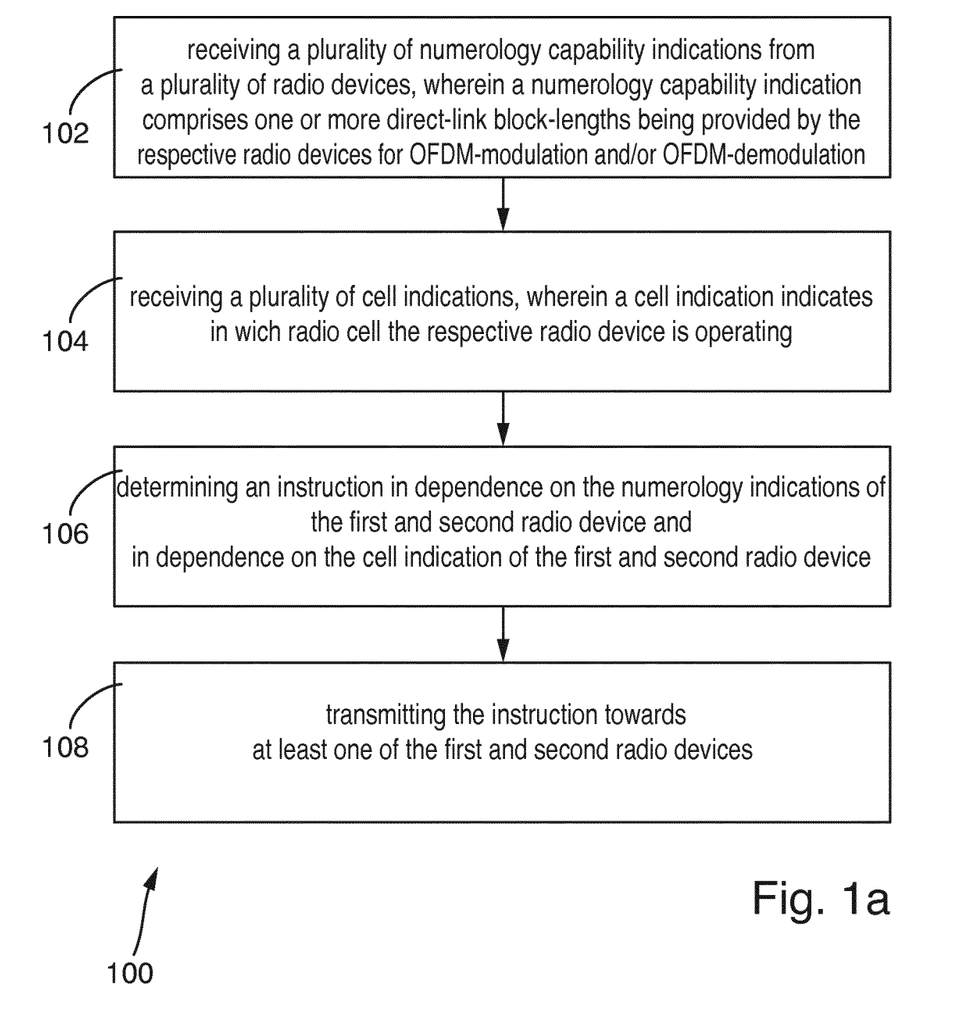
FIGS. 1a, 1b, 1c show a schematic flow chart, respectively.

FIG. 1a shows a schematic flow chart 100 for managing a cellular radio communications network, flow chart 100 comprising steps 102, 104, 106 and 108.

Figure 1B:
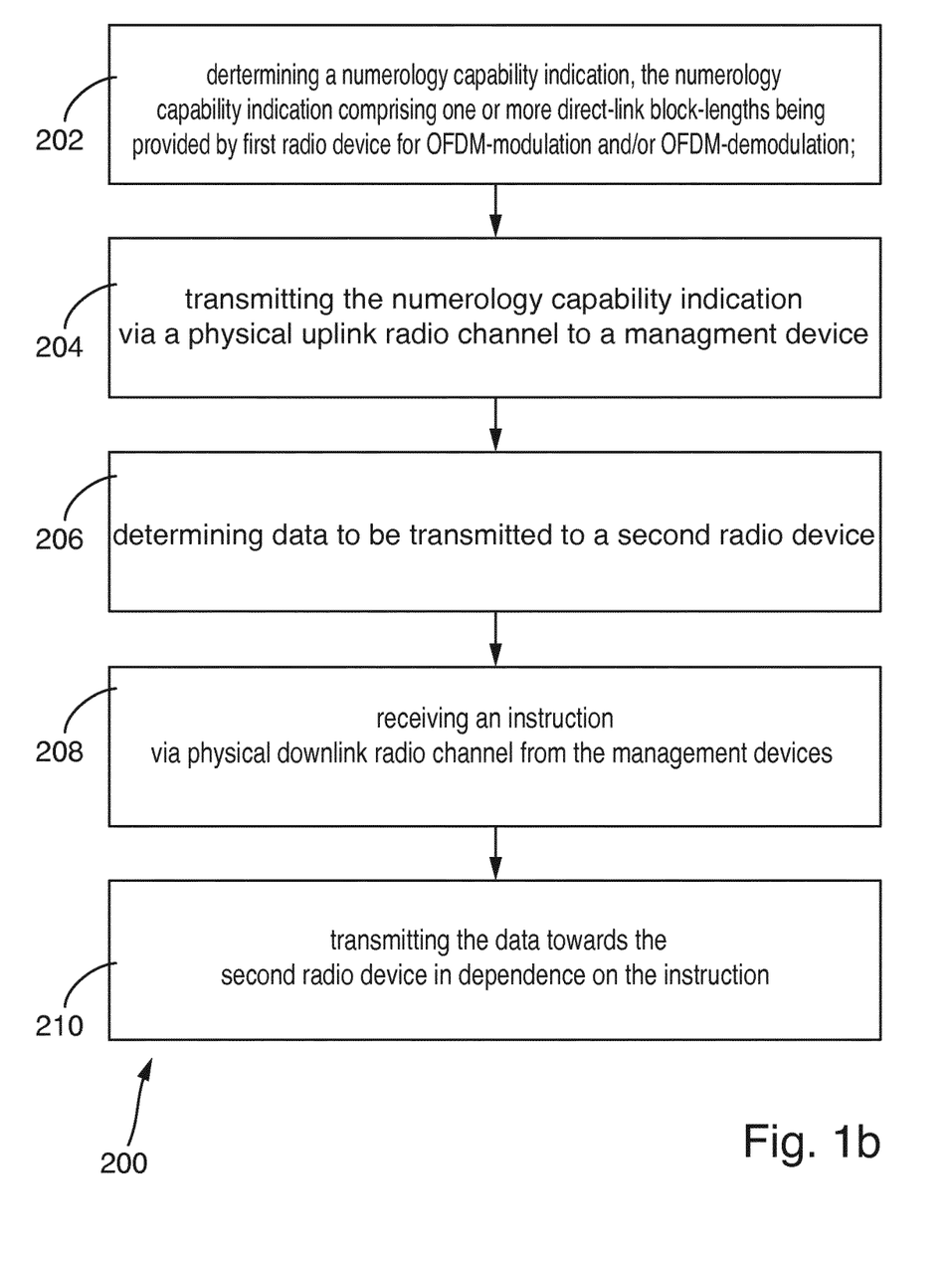

FIG. 1b shows a schematic flow chart 200 for operating a first user equipment, the flow chart 200 comprising the steps 202, 204, 206, 208 and 210.

Figure 1C:
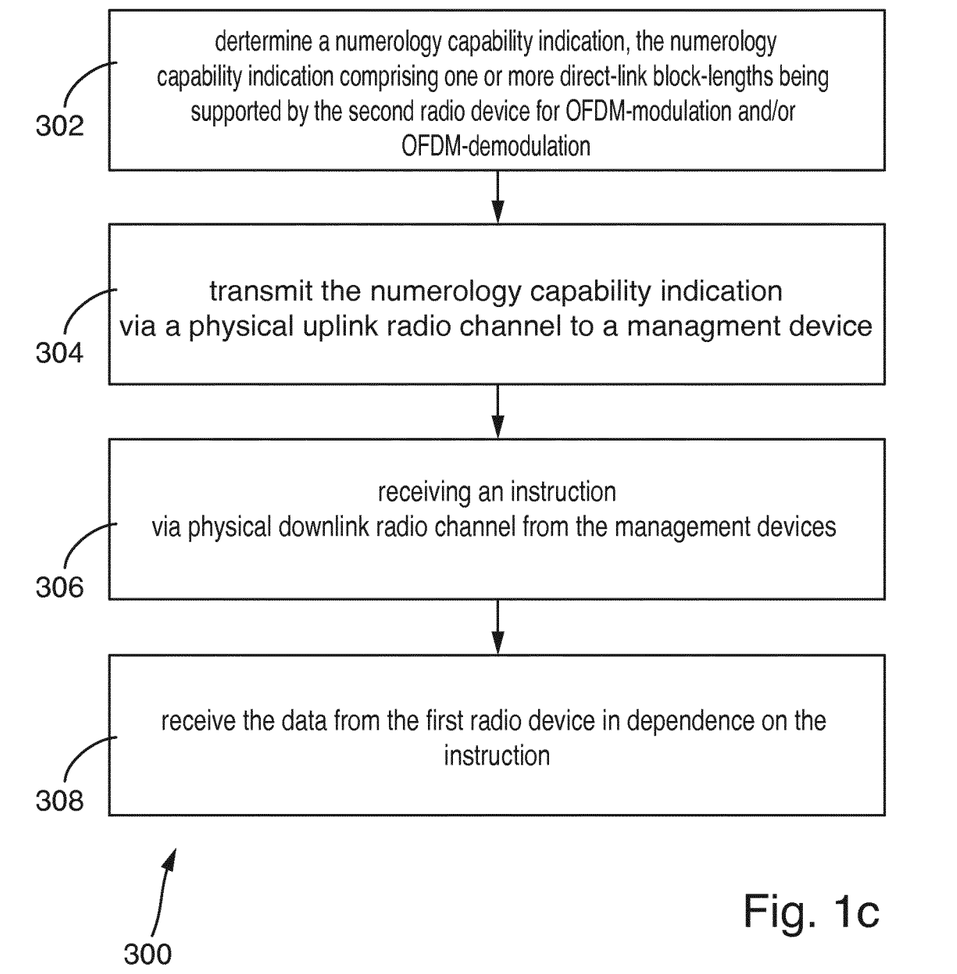

FIG. 1c shows a schematic flow chart 300 for operating a second user equipment, the flow chart 300 comprising the steps 302, 304, 306, and 308.

Figure 2:
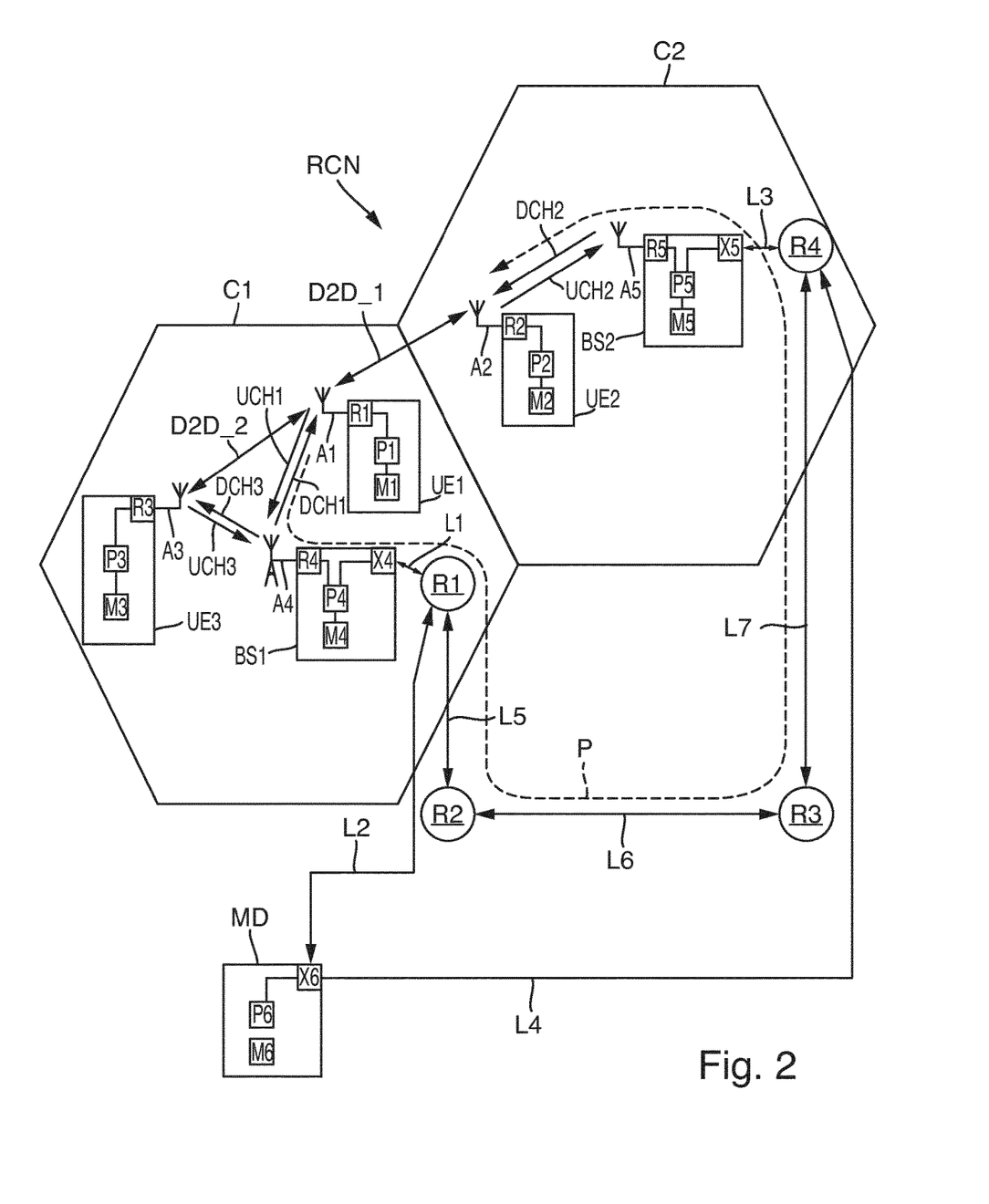
FIG. 2 shows a schematic cellular radio communications network.

FIG. 2 shows a schematic cellular radio communications network RCN. The cellular radio communications network RCN is a cellular network, wherein a first radio network infrastructure device BS1 serves a radio cell C1 and a second radio network infrastructure device BS2 serves a radio cell C2. The radio network infrastructure devices BS1, BS2 are a base station, a LTE eNodeB, a 5G transmission point, a WiFi access point, a remote radio head, RRH, or the like. The first radio network infrastructure device BS1 is in particular suitable to serve the radio cell C1 and to connect user equipments in the sense of radio devices UE1, UE3 inside the radio cell C1 to the cellular radio communications network RCN. The first radio network infrastructure device BS1 is e.g. implemented as a stand-alone equipment. The radio devices UE1, UE3 reside in the radio cell C1 and may be referred to as user equipment or machine equipment.

The radio devices UE1, UE2, UE3 comprise an OFDM-modulator 1000 and/or an OFDM-demodulator 2000, respectively, which are explained in connection with FIGS. 3 and 4. The radio network infrastructure devices BS1, BS2 comprise an OFDM-modulator and an OFDM-demodulator which operates with a single block length only.

According to an embodiment, also the radio network infrastructure devices BS1, BS2 comprise an OFDM-modulator 1000 and/or an OFDM-demodulator 2000, respectively, therefore operating with different block lengths.

The radio devices UE1 to UE3 and the radio network infrastructure device BS1, BS2 comprise a memory M, a processor P, a radio module R, and an antenna A. Furthermore, the radio network infrastructure devices BS1, BS2 comprises a network interface X. A management device MD comprises a processor P6, memory M6 and the network interface X6.

The processors P are implemented using e.g. a DSP, FPGA, or the like or a combination thereof. The memory M is implemented using e.g. a RAM, ROM, DDR, Flash memory, or the like, or a combination thereof. The memory M stores e.g. computer readable instructions, thus instructions executable by the processor P.

The first radio network infrastructure device BS1 is connected via a link L1 to a router R1. The management device MD is connected via a link L2 to the router R1. The radio network infrastructure device BS2 is connected via a link L3 to a router R4. The management device MD is connected via a link L4 to the router R4. The router R1 is connected to a router R2 via a link L3. The router R2 is connected via a link L6 to a router R3. The router R3 is connected via a link L7 to the router R4. A signaling path P between the radio devices UE1 and UE2 can be established via the first radio network infrastructure device BS1, the routers R1, R2, R3, R4 and the radio network infrastructure device BS2, wherein each of the routers R1 to R4 can be also termed radio network infrastructure device. In other examples more than one cell is connected to one router. It is also possible that all cells are connected to the same router.

At least parts of the above described cellular radio communications network RCN including sender and/or receiver of the radio network infrastructure device BS1, BS2 and the management device MS could be implemented using network functions virtualization (NFV). NFV is a network architecture that makes use of technologies of computer virtualization. Entire network equipment like sender or receiver or parts thereof or part of their functions can be virtualized using software building blocks that may connect, or interact, to create communication services. A virtualized network function of e.g. a sender or receiver may include at least one virtual machine running different software and processes, on top of standard high-volume servers, switches and storage, or a cloud computing infrastructure, instead of having customized hardware appliances for each network function. As such a sender or receiver function may be implemented in a computer program using a computer program product embodied on a non-transitory computer readable medium for performing operations, wherein the computer program product comprises instructions, that when executed by a processor, perform the operations of the specific base station, eNodeB, network node, MME (Mobility Management Entity) and/or UE function.

The methods described herein relate to digital signal processing and could thus be implemented using a processor like a digital signal processor, or the like. At least some of the functions relate to baseband processing and could thus be implemented using a transceiver, e.g. a baseband transceiver. The radio module is e.g. a radio module, or a remotely located so called RRH (Remote Radio Head). The constellation with a RRH is often used in connection with a so called NFV (Network Functions Virtualization) implementation, where a substantial part of processing is centralized in a server farm with a plurality of processors and a plurality of memory, and the radio specific up-conversion, the antenna and the digital-to-analog converter for data transmission in downlink to the user equipment and the analog-to-digital converter for receiving data from the user equipment in uplink is remotely located. The radio module is also called radio frontend and includes e.g. a digital-to-analog converter, a low-pass filter, a mixer, a local oscillator, a power amplifier and an antenna. The local oscillator generates the radio frequency which is mixed on the processed data. The aforementioned modules/functions could be placed in serial order. Some modules might be not be used or replaced by others dependent on the technology used. For MIMO or massive MIMO some modules need to be duplicated, e.g. a plurality of antennas is used instead of one and corresponding amplifiers, etc. Additional modules might be added for performing and/or supporting specific functions as e.g. beamforming, CoMP (coordinated multipoint), eICIC (enhanced inter-cell interference control), or the like. User equipment (UE) could be implemented as a device with a radio module, e.g. smartphone, tablet, smartwatch, sensor, actuator, equipment inside a vehicle, machine-to-machine equipment, or else. The radio communications network RCN is an OFDM (Orthogonal Frequency Division Multiplex) type network, e.g. UF-OFDM, F-OFDM, ZT-s-OFDM, P-OFDM, FC-OFDM, or another multi-carrier network, e.g. FS-FBMC, QAM-FBMC, etc. E.g. QAM—Quadrature Amplitude Modulation and/or QPSK—Quadrature Phase Shift Keying are used as modulation technique. The radio network RCN allocates resources using a scheduler and a time-frequency-resource grid, a t-f-resource. The t-f-resource includes time slots and associated subcarriers. The subcarriers are e.g. grouped in frequency subbands. A subband is assigned at least one subband parameter. A subband parameter is e.g. subcarrier spacing, other parameters are e.g. symbol duration, time overhead, time overhead type like zero postfix or cyclic prefix, windowing or filtering parameters. Dependent on the assigned or selected parameters the subband is characterized for a specific transmission type and is in particular suitable for the transmission of specific services. A service is e.g. eMBB (enhanced mobile broadband), mMTC (massive machine-type-communication), URLLC (ultra reliable low latency communication), vehicle-to-vehicle communication, voice, video, etc. An allocated physical resource block thus assigns a dedicated time slot associated with one or more subcarriers or a subband to a data packet. A physical resource block assigns one time slot to a subcarrier. A time slot is e.g. called a TTI (transmission time interval). The period of time could e.g. be one or more time slots. Data and control signals are transmitted using physical radio channels, e.g. physical downlink shared channel, physical downlink control channel, common control physical channel. Further data and control signals could be transmitted using broadcast channel, paging channel, multicast channel.

Figure 3:
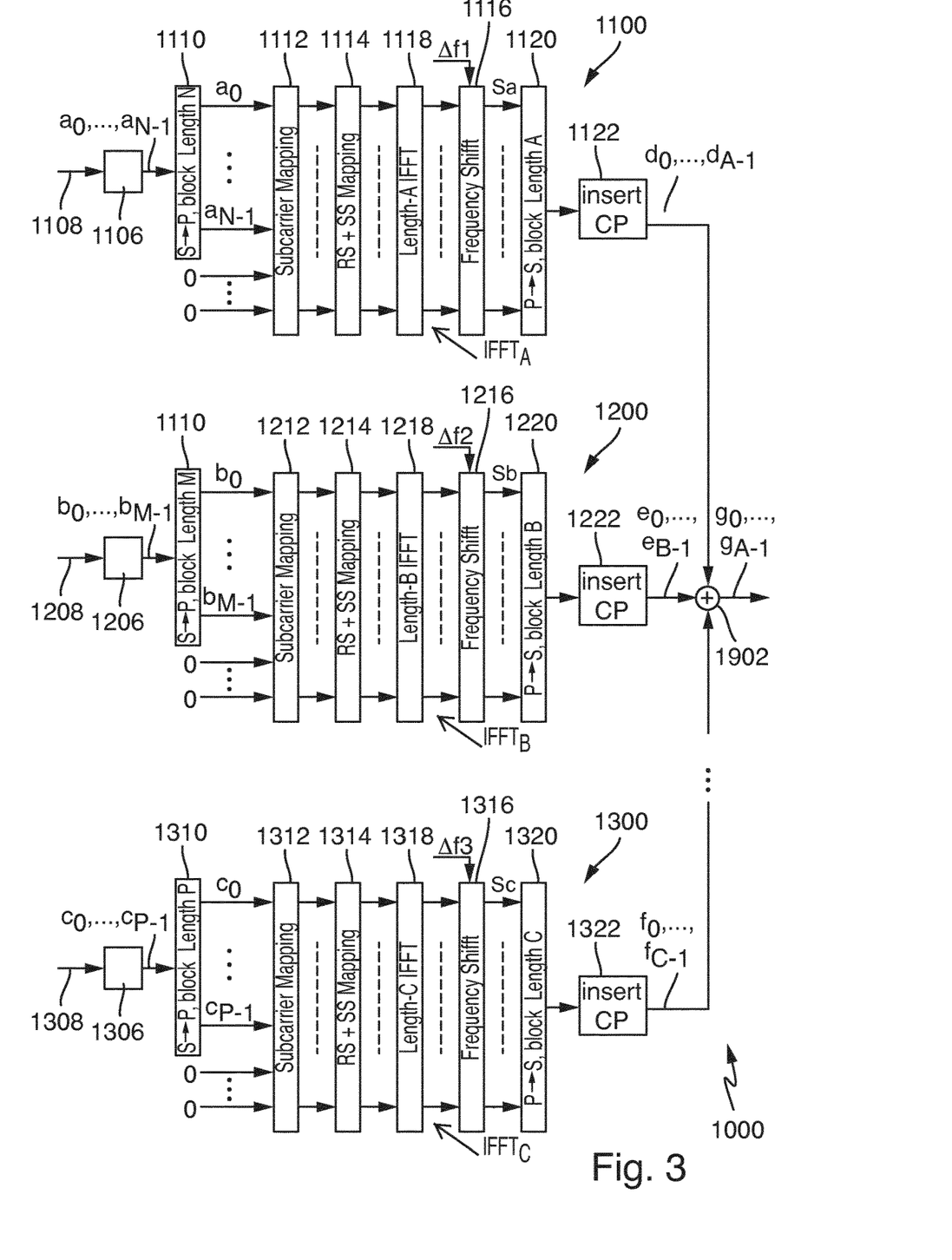
FIGS. 3 and 4 show a schematic block diagram of an ODFM-modulator or an OFDM-demodulator, respectively.

FIG. 3 shows a schematic block diagram of the ODFM-modulator 1000 with a plurality of processing chains 1100, 1200, 1300. Of course, further processing chains are possible. The processing chain 1100 is described in detail in the following, wherein the further processing chains are similar to the processing chain 1100 but may differ at least in the used respective block lengths and frequency offsets. A block 1106 determines the first ingress modulation-symbol stream $a_0, \ldots, a_{N-1}$ in dependence on a first ingress data stream 1108. The block 1106 may comprise an QAM-modulator (Quadrature Amplitude Modulation) and/or an QPSK-modulator (Quadrature Phase Shift Keying), a channel precoder, and/or further processing entities. A serial to parallel converter 1110 converts the first ingress modulation-symbol stream $a_0, \ldots, a_{N-1}$ from a serial to a parallel symbol stream. The parallelized first ingress modulation-symbol stream is applied to a subcarrier mapper 1112. A mapper 1114 maps reference symbols and/or synchronisation symbols to the modulation-symbol stream. The modulation-symbol stream determined by the mapper 1114 is applied to an inverse Fast Fourier Transform block 1118 to determine the inverse Fast Fourier Transform $IFFT_A$ in dependence on the first ingress modulation-symbol stream $a_0, \ldots, a_{N-1}$. A frequency shifter 1116 shifts the applied inverse Fast Fourier Transform $IFFT_A$ by the applied first frequency offset $\Delta f1$ to determine a plurality of first frequence-shifted samples Sa in dependence on the first inverse Fast Fourier Transform $IFFT_A$. The first frequency-shifted samples Sa are serialized by means of a parallel-to-serial converter 1120 and applied to a cyclic prefix (CP) inserter 1122 to determine the first egress sample stream $d_0, \ldots, d_{A-1}$. The cyclic prefix inserter 1122 can be also omitted.

The processing chains 1200, 1300 differ from the processing chain 1100 as described above in the following: The ingress data streams 1208 and 1308 and 1108 are mutually different with respect to their contents. The second and third block lengths B, C of the second and third inverse Fast Fourier Transform $IFFT_B$, $IFFT_C$ multiplied with a respective integer factor K, also termed K-factor, equal the first block length A of the first inverse Fast Fourier Transform $IFFT_A$. The first block length A is also termed the main block length or the main FFT length. The block lengths N, M and P of the serial to parallel converters 1110, 1210 and 1310 are equal or smaller than the respective block length A, B, C of the corresponding inverse Fast Fourier Transform block 1118, 1218, 1318.

Given the largest block length of the fourier transform in the sense of the main block length A, each processing chain has to fulfil the following equation (1) with a FFT block length bl and the corresponding K-factor K. From equation (1) it is apparent that the K-Faktor K always equals to a power of two.

$$bl*K=A \quad (1)$$

For cellular radio communications network RCN with the main block length A of 2048 also legacy LTE devices can be supported. In this case the subcarrier spacing f0 providing a fixed subcarrier spacing grid for all of the other processing chains is 15 kHz. Of course, the main block length A can be chosen differently, however loosing compatibility with legacy LTE devices. The sample time Ts is the same for all systems and forms together with a basic subcarrier spacing f0 the fixed elementary parameters of all configurations. The K-factor K for each FFT length can then be determined according to equation (2).

$$K=1/(FFT\ length*Ts*f0) \quad (2)$$

For applications with a demand for low energy consumption and short symbol rates, the second radio device UE may only comprise processing chains with a high K-Factor, particularly a K-factor K greater than 1.

The following equations (3) to (6) show that the modulation and demodulation scheme proposed in this description still provides that the subcarriers are orthogonal. Equation (3) provides the Fast Fourier Transform FFT_R of block length R with the parameter k. In equation (4) the right hand term is separated into two components X_I and X_II each representing—as we will see—Fast Fourier Transforms. Equation (5) comprises a parameter transform from parameter k of equation (4) to the parameter 2*u. Equation (6) represents equation (5) in a rewritten form. Equations (5) and (6) provide two Fast Fourier Transforms XI(u) and XII(u) of a block length of R/2 in comparison with the Fast Fourier Transform of block length R in equations (3) and (4). Consequently, subcarrier orthogonality is maintained while FFT block lengths are used that comply with the K-factor scheme described in equation (1).

$$FFT_R(k) = \sum_{n=0}^{R-1} x(n)*e^{-j\frac{2\pi}{R}kn} \quad (3)$$

$$FFT_R(k) = \underbrace{\sum_{r=0}^{\frac{R}{2}-1} x(r)*e^{-j\frac{2\pi}{R}kr}}_{X_I(k)} + \underbrace{\sum_{r=\frac{R}{2}}^{R-1} x(r)*e^{-j\frac{2\pi}{R}kr}}_{X_{II}(k)} \quad (4)$$

$$FFT_R(2u) = \underbrace{\sum_{r=0}^{\frac{R}{2}-1} x(r)*e^{-j\frac{2\pi}{R}2ur}}_{X_I(u)} + \underbrace{\sum_{r=\frac{R}{2}}^{R-1} x(r)*e^{-j\frac{2\pi}{R}2ur}}_{X_{II}(u)} \quad (5)$$

$$FFT_R(2u) = \underbrace{\sum_{r=0}^{\frac{R}{2}-1} x(r)*e^{-j\frac{2\pi}{R/2}ur}}_{X_I(u)} + \underbrace{\sum_{r=\frac{R}{2}}^{R-1} x(r)*e^{-j\frac{2\pi}{R/2}ur}}_{X_{II}(u)} \quad (6)$$

The following table 1 shows possible configurations for processing chains of the OFDM-modulator 1000 and the OFDM-demodulator 2000.

TABLE 1

| FFT Length | Num N of PRBs | K-Factor | N * K | Symbol Length in μs | Bandwidth | Integration in LTE 20 MHz |
|---|---|---|---|---|---|---|
| 16 | 1 | 128 | 128 | 0.5 | 23.04 MHz | No |
| 32 | 1 | 64 | 64 | 1.0 | 11.52 MHz | Yes |
| 64 | 1 | 32 | 32 | 2.1 | 5.76 MHz | Yes |
|  | 2 |  | 64 |  | 11.52 MHz |  |
|  | 3 |  | 96 |  | 17.28 MHz |  |
| 128 | 1 | 16 | 16 | 4.2 | 2.88 MHz | Yes |
|  | 2 |  | 32 |  | 5.76 MHz |  |
|  | 3 |  | 48 |  | 8.64 MHz |  |
|  | 4 |  | 64 |  | 11.52 MHz |  |
|  | 5 |  | 80 |  | 14.40 MHz |  |
|  | 6 |  | 96 |  | 17.28 MHz |  |
| 256 | 1 | 8 | 8 | 8.33 | 1.44 MHz | Yes |
|  | 2 |  | 16 |  | 2.88 MHz |  |
|  | 3 |  | 24 |  | 4.32 MHz |  |
|  | 4 |  | 32 |  | 5.76 MHz |  |
|  | 5 |  | 40 |  | 7.20 MHz |  |
|  | 6 |  | 48 |  | 8.64 MHz |  |
|  | 7 |  | 56 |  | 10.08 MHz |  |
|  | 8 |  | 64 |  | 11.52 MHz |  |
|  | 9 |  | 72 |  | 12.96 MHz |  |
|  | 10 |  | 80 |  | 14.40 MHz |  |
|  | 11 |  | 88 |  | 15.84 MHz |  |
|  | 12 |  | 96 |  | 17.28 MHz |  |
| 512 | 1 | 4 | 4 | 16.65 | 0.72 MHz | Yes |
|  | 2 |  | 8 |  | 1.44 MHz |  |
|  | 3 |  | 12 |  | 2.16 MHz |  |
|  | 4 |  | 16 |  | 2.88 MHz |  |
|  | 5 |  | 20 |  | 3.60 MHz |  |
|  | 6 |  | 24 |  | 4.32 MHz |  |
|  | 7 |  | 28 |  | 5.04 MHz |  |
|  | 8 |  | 32 |  | 5.76 MHz |  |

TABLE 1-continued

| FFT Length | Num N of PRBs | K-Factor | N * K | Symbol Length in µs | Bandwidth | Integration in LTE 20 MHz |
|---|---|---|---|---|---|---|
| | 9 | | 36 | | 6.48 MHz | |
| | 10 | | 40 | | 7.20 MHz | |
| | 11 | | 44 | | 7.92 MHz | |
| | 12 | | 48 | | 8.64 MHz | |
| | 13 | | 52 | | 9.36 MHz | |
| | 14 | | 56 | | 10.08 MHz | |
| | 15 | | 60 | | 10.80 MHz | |
| | 16 | | 64 | | 11.52 MHz | |
| | 17 | | 68 | | 12.24 MHz | |
| | 18 | | 72 | | 12.96 MHz | |
| | 19 | | 76 | | 13.68 MHz | |
| | 20 | | 80 | | 14.40 MHz | |
| | 21 | | 84 | | 15.12 MHz | |
| | 22 | | 88 | | 15.84 MHz | |
| | 23 | | 92 | | 16.56 MHz | |
| | 24 | | 96 | | 17.28 MHz | |
| | 25 | | 100 | | 18.00 MHz | |
| 1024 | 1 | 2 | 2 | 33.3 | 0.36 MHz | Yes |
| | 2 | | 4 | | 0.72 MHz | |
| | 3 | | 6 | | 1.08 MHz | |
| | 4 | | 8 | | 1.44 MHz | |
| | 5 | | 10 | | 1.80 MHz | |
| | 6 | | 12 | | 2.16 MHz | |
| | 7 | | 14 | | 2.52 MHz | |
| | 8 | | 16 | | 2.88 MHz | |
| | 9 | | 18 | | 3.24 MHz | |
| | 10 | | 20 | | 3.60 MHz | |
| | 11 | | 22 | | 3.96 MHz | |
| | 12 | | 24 | | 4.32 MHz | |
| | 13 | | 26 | | 4.68 MHz | |
| | 14 | | 28 | | 5.04 MHz | |
| | 15 | | 30 | | 5.40 MHz | |
| | 16 | | 32 | | 5.76 MHz | |
| | 17 | | 34 | | 6.12 MHz | |
| | 18 | | 36 | | 6.48 MHz | |
| | 19 | | 38 | | 6.84 MHz | |
| | 20 | | 40 | | 7.20 MHz | |
| | 21 | | 42 | | 7.56 MHz | |
| | 22 | | 44 | | 7.92 MHz | |
| | 23 | | 46 | | 8.28 MHz | |
| | 24 | | 48 | | 8.64 MHz | |
| | 25 | | 50 | | 9.00 MHz | |
| LTE: 2048 | 1 ... 100 | 1 | 1 ... 100 | 66.6 | 0.18 ... 18 MHz | Yes |

An adder 1902 adds the first, second and third egress sample streams $d_0, \ldots, d_{A-1}, e_0, \ldots, e_{B-1}, f_0, \ldots, f_{C-1}$ to a sum, namely the joined sample stream $g_0, \ldots, g_{A-1}$. The joined sample stream $g_0, \ldots, g_{A-1}$ is applied to the respective radio module R1, R2 for further processing including e.g. digital-to-analog conversion and subsequently up-converted to a carrier frequency higher than respective subcarrier frequencies. Of course, other implementations of the radio modules R1, R2 are possible.

Figure 4:
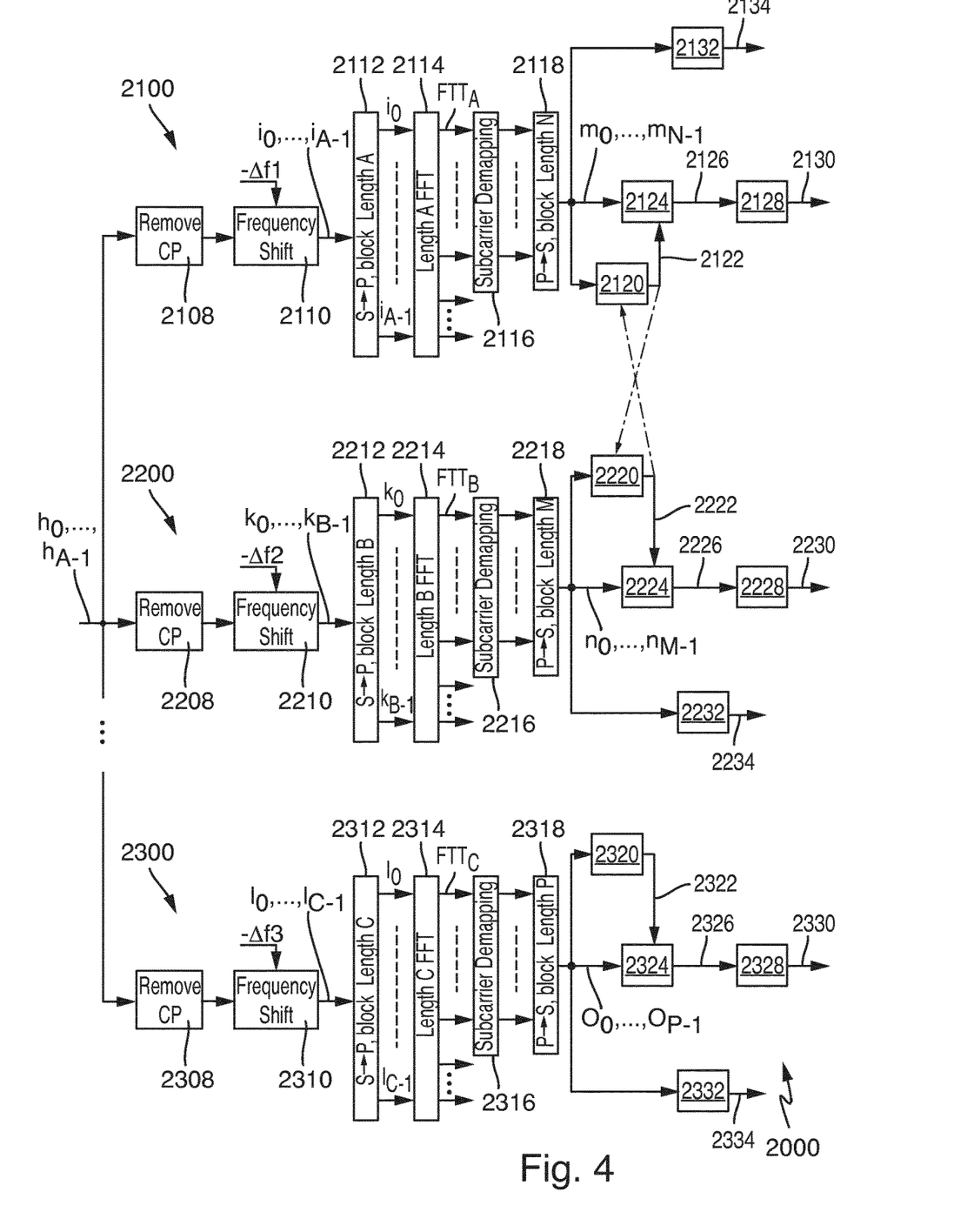

The serial-to parallel-converters and the parallel-to-serial converters in FIGS. 3 and 4 are arranged at an exemplary position. Of course these converters can be arranged at other positions to optimize the respective processing chain.

FIG. 4 shows schematic block diagram of an OFDM-demodulator 2000 with a plurality of processing chains 2100, 2200, 2300. Of course, further processing chains are possible. The processing chain 2100 is described in detail in the following, wherein the further processing chains are similar to the processing chain 2100. A cyclic prefix remover 2108 removes a cyclic prefix CP. The cyclic prefix remover 2108 can also be omitted. The frequency shifter 2110 back-shifts the down-converted sample stream $h_0, \ldots, h_{A-1}, \ldots$ not comprising the cyclic prefix in dependence on the supplied first frequency offset $\Delta f1$. The frequency shifter 2110 determines the first ingress sample stream $i_0, \ldots, i_{A-1}$, which is parallelized by a serial-to-parallel converter 2112. A forward Fast Fourier Transform block 2114 determines the forward Fast Fourier Transform $FFT_A$ of the first block size A in dependence on the parallelised ingress sample stream $i_0, \ldots, i_{A-1}$. A demapper 2116 demaps the subcarriers. A parallel-to-serial converter 2118 of block length N determines the first egress demodulation-symbol stream $m_0, \ldots, m_{N-1}$ in dependence on the first forward Fast Fourier Transform $FFT_A$. A channel estimator 2120 determines a channel estimate 2122 in dependence on reference symbols contained in the first egress demodulation-symbol stream $m_0, \ldots, m_{N-1}$. An equalizer 2124 determines an equalized egress modulation-symbol stream 2126 in dependence on the first egress demodulation-symbol stream $m_0, \ldots, m_{N-1}$ and in dependence on the channel estimate 2122. As indicated with arrows the channel estimates 2122 and 2222 can be exchanged, wherein for example the estimator 2120 receives the channel estimate 2222. A block 2128 determines an egress data stream 2130 in dependence on the equalized egress demodulation-symbol stream 2126. The channel estimator 2120 and the equalizer 2124 are only examplary and may comprise other taps regarding the respective input and output symbol streams. The block 2128 may comprise an QAM-demodulator (Quadrature Amplitude Modulation) and/or an QPSK-demodulator (Quadrature Phase Shift Keying), a channel de-coder, and/or further processing entities. The egress data stream 2130 equals the ingress data stream 1108. A correlator 2132 detects a synchronization symbol in the first egress demodulation-symbol stream $m_0, \ldots, m_{N-1}$ and determines a synchronisation state 2134.

The processing chains 2200, 2300 differ from the processing chain 2100 as described above in the following: The egress data streams 2130 and 2230 and 2330 are mutually different with respect to their contents. The second and third block lengths B, C of the second and third forward Fast Fourier Transform $FFT_B$, $FFT_C$ multiplied with the K-factor equals the main block length A.

Figure 5:
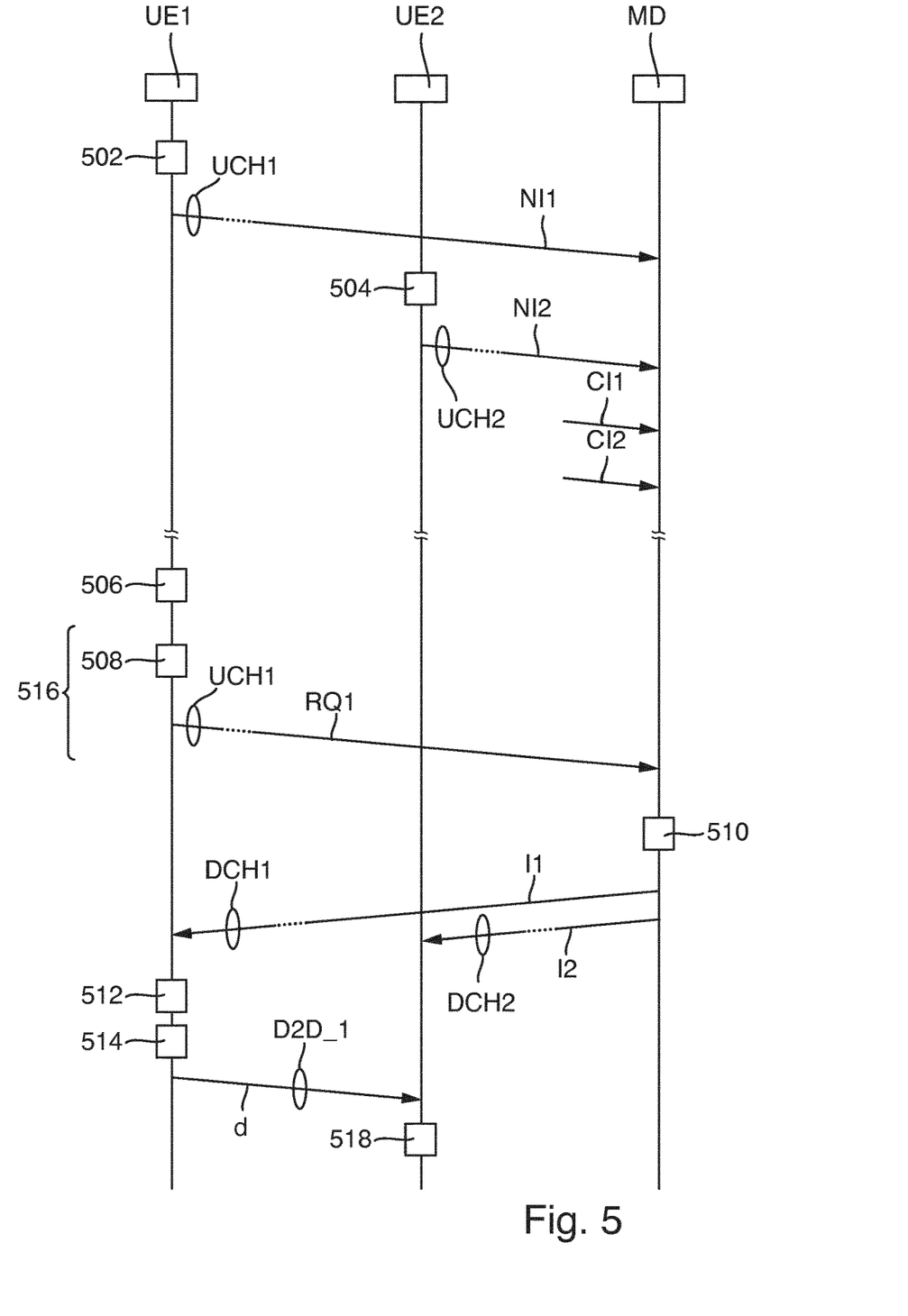
FIGS. 5, 6 and 7 show schematic sequence diagram, respectively.

FIG. 5 shows schematic sequence diagram. The first radio device UE1 determines in a step 502 a first numerology capability indication NI1 and transmits the first numerology capability indication NI1 via a first physical uplink radio channel UCH1 to the radio network infrastructure device BS1 and from BS1 to the management device MD. The second radio device UE2 determines in a step 504 a second numerology capability indication NI2 and transmits the second numerology capability indication NI2 via a second physical uplink radio channel UCH2 to the second to the management device MD. The numerology capability indications CI1, CI2 comprise one or more direct-link block lengths B, C being provided by the respective radio device UE1, UE2 for OFDM-modulation and/or OFDM-demodulation for a physical direct-link radio channel D2D_1. Therefore, the management device MD receives the plurality of numerology capability indications NI1, NI2 from the plurality of radio devices UE1, UE2.

In the present case, the radio devices UE1 and UE2 offer overlapping direct-link block lengths B, C for a modulation and/or demodulation of the respective physical direct link radio channel D2D_1. The management device MD also receives a plurality of cell indications CI1, CI2, wherein the cell indication CI1, CI2 indicate, in the present case, that the radio cells C1, C2 in which the radio devices UE1, UE2 are operating, are adjacent.

In a step 506 data d is determined to be transmitted to the second radio device UE2.

In a step 508 it is determined a request RQ1 for a data transmission to the second radio device UE2. The request RQ1 is transmitted via the physical uplink radio channel UCH1 to the management device MD. The request RQ1 is received by the management device MD from the first radio device UE1 requesting a data transfer to the second radio device UE 2.

In a step 510 the management device MD determines an instruction message I1 and/or I2 in dependence on the numerology indications NI1, NI2 of the first and second radio device UE1 UE2 and in dependence on the cell indications CI1, CI2 of the first and second radio device UE1, UE2. In the present case, a physical direct-link radio channel D2D_1 can be established, which is reflected in the instruction messages I1, I2. The management device MD transmits the instruction message I1, I2 towards at least one of the first and second radio devices UE1, UE2.

The first radio device UE1 receives the instruction message I1 via a physical downlink radio channel DCH1. The second radio device UE2 receives an instruction message I2 via a physical downlink radio channel DCH 2 from the management device MD.

The instruction message I1 is received by the first radio device UE1 as a response to the request RQ1 in the sense of a sequence 516. In another embodiment the instruction message I1 is received by the first radio device UE 1 unsolicited, therefore omitting the sequence 516.

The instruction message I2 is received by the second radio device UE 2 via a physical downlink radio channel DCH2 from the management device MD. The instruction message I2 comprises an indication about how to receive the data d from the first radio device UE 1, particularly a respective direct-link block length B, C. In a step 512 the instruction message I1 is demodulated in dependence on the forward Fast Fourier Transform FFT of the first block length A. Of course, the demodulation of the instruction message I1 could be achieved also with another block length.

In a step 514 the data d to be transmitted to the second radio device UE 2 is modulated with the OFDM-modulator 1000 using an inverse Fast Fourier Transform FFT of the direct-link block length B, C indicated in the instruction message I1. Therefore, the data d is transmitted towards the second radio device UE2 in dependence on the instruction message I1.

In a step 518 the data d is received via the physical direct-link channel D2D_1. The data d is demodulated in step 518 with the OFDM-demodulator 2000 using a forward Fast Fourier Transform FFT of the direct-link block length B, C indicated in the instruction message I2. Therefore, the data d is received from the first radio device UE1 in dependence on the instruction message I2.

According to an embodiment the direct-link block lengths B, C used for the modulation/demodulation according to the physical direct-link radio channel D2D_1 is smaller than the main block length A used for the physical uplink/downlink radio channels UCH1, UCH2, DCH1, DCH2.

Therefore, the data d is transmitted towards the second radio device UE2 in dependence on the instruction message I1. Data d is received from the first radio device UE1 in dependence on the instruction message I2.

Figure 6:
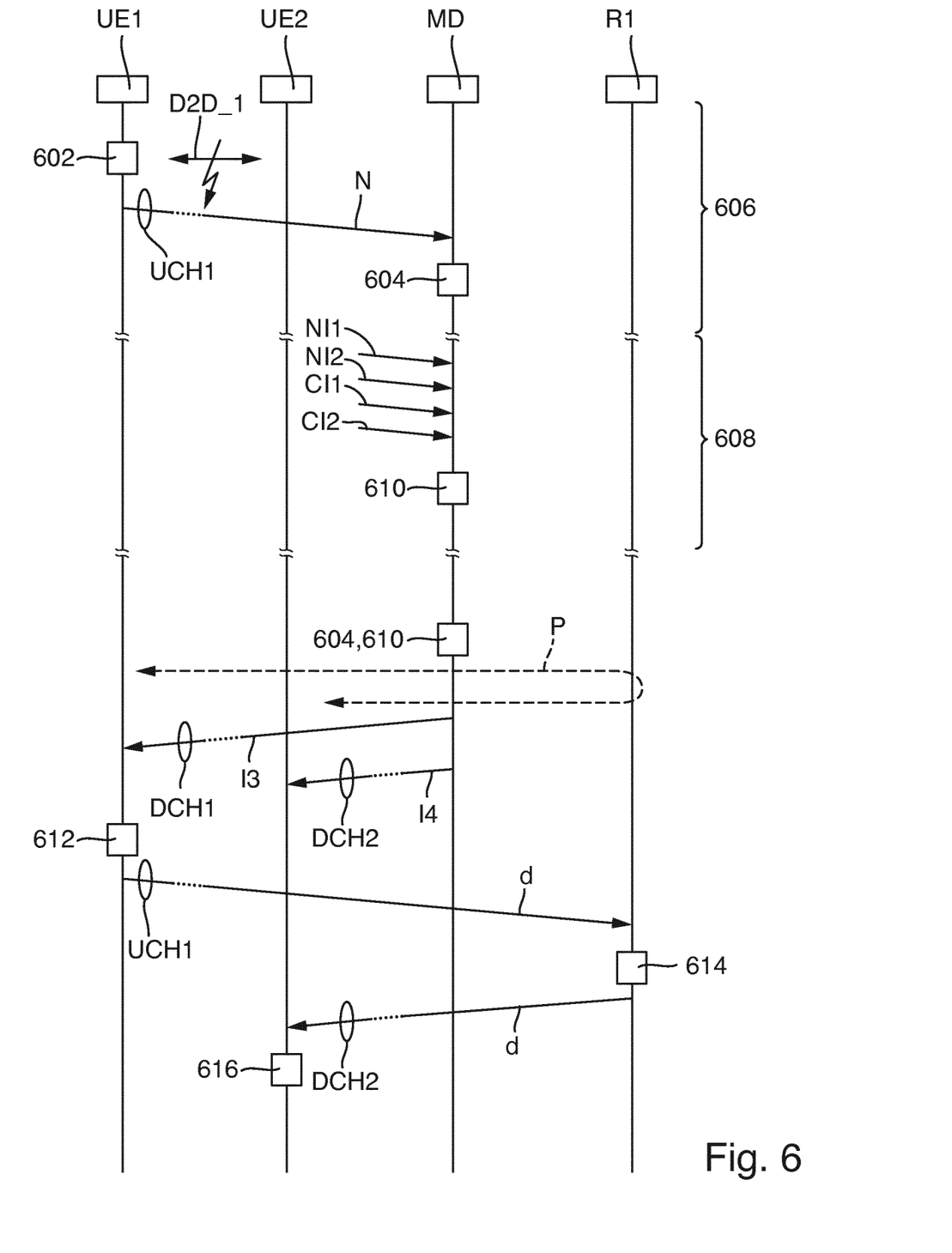

FIG. 6 shows a schematic sequence diagram. In step 602 the first radio device UE1 determines a malfunction of the physical direct-link radio channel D2D_1 between the first and the second radio devices UE1 and UE2. The notification N is modulated with the OFDM-modulator 1000 in dependence on the first bock length A. The management device MD receives the notification N from the first radio device UE1 that the physical direct-link radio channel D2D_1 is malfunctioning. In a step 604 further instruction messages I3, I4 are determined for at least one of the first and second radio devices UE1, UE2 as a response to the notification N. The steps 602 and 604 as also the transmission of notification N are part of a sequence 606.

According to a sequence 608 the management device MD receives the numerology indications NI1, NI2 and the cell indications CI1, CI2. In the step 610 the management device MD determines the further instruction messages I3, I4 in dependence on numerology indications NI1, NI2 and cell indications CI1, CI2. The further instruction messages I3, I4 comprise the instruction for the radio devices UE1 and UE2 to communicate over the signalling path P instead of a physical direct-link radio channel D2D.

In the steps 604 and 610 it is determined that the direct link between the first and the second radio devices UE1 and UE2 in the sense of the physical direct-link radio channel D2D_1 is not available. Therefore the signalling path P between the first and the second radio devices UE1 and UE2 is determined, wherein the signalling path P passes through at least one radio network infrastructure device R1.

In step 610 it can be determined to that the radio devices UE1 and UE2 do not offer identical direct-link block lengths. Additionally or alternatively it can be determined that the radio devices UE1 and UE2 are not located close enough for establishing the physical direct-link radio channel in dependence on the cell indications CI1 and CI2.

For example, the cell indications CI1 and CI2 may indicate that the radio devices UE 1 and UE 2 are located in cells being not adjacent.

After receiving the further instruction message I3 the first radio device UE 1 modulates the data d in a step 612 by means of the OFDM-modulator 1000 and in dependence on an inverse Fast Fourier Transform IFFT of the first block length A, which can also be termed uplink block length. The data d is transmitted towards the second radio device UE2 via the physical uplink radio channel UCH1. On the side of the receiving section of the second radio network infrastructure device BS2, the received data d is demodulated with a demodulator and forwarded along the signalling path P passing the router R1. The router R1 determines in a step 614 how to forward the data d. Data d is forwarded to the second radio device UE 2 inter alia via the second downlink radio channel DCH2.

After receiving the further instruction messages I4 the second radio device UE 2 receives the data d via the second physical downlink radio channel DCH2 and demodulates the data d by means of the OFDM-demodulator 2000 in dependence on the first block length A as indicated in the instruction message I4. Of course, a further block length for demodulating the data d could be determined.

Therefore, the data d is transmitted towards the second radio device UE2 in dependence on the further instruction message I3. Data d is received from the first radio device UE1 in dependence on the further instruction message I4.

Figure 7:
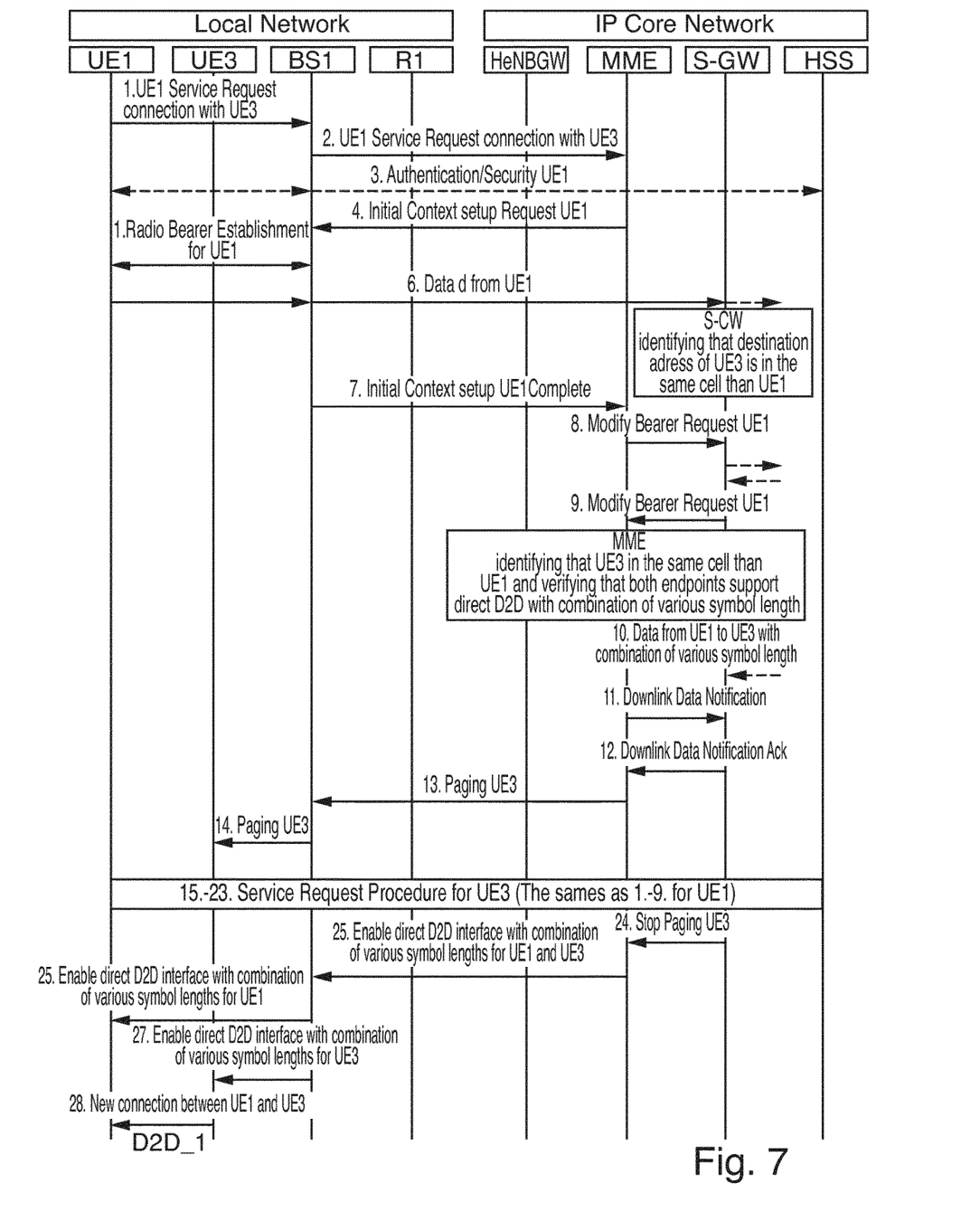

FIG. 7 shows a further sequence diagram for operating the cellular radio communications network when it is possible to establish a physical direct-link radio channel D2D_2 within the same radio cell C1 as outlined to FIG. 2. According to steps 1 to 28 the new connection in the sense of the physical direct-link radio channel D2D_1 is established. The function of the management device MD resides in the IP core network and is divided between the following entities: a Home NB Gateway HeNB GW, a Mobility Management Entity MME, a Serving-Gateway S-GW, and a Home Subscriber Server HSS. However, the functions on the side of the IP core network and the radio network infrastructure device BS1 can be divided according to the previously mentioned network functions virtualization (NFV).

The invention claimed is:

1. A method of operating a management device for managing a cellular radio communications network (CRN), the method comprising:
   receiving, by a management device, a plurality of numerology capability indications from a plurality of radio devices, wherein a numerology capability indication comprises one or more direct-link block lengths being provided by the respective radio device for communicating via a physical direct-link radio channel;
   receiving, by the management device, a plurality of cell indications, wherein the cell indication indicates in which radio cell the respective radio device is operating;
   determining, by the management device, an instruction message in dependence on the numerology indications of the first and second radio device and in dependence on the cell indication of the first and second radio device; and
   transmitting, by the management device, the instruction message towards at least one of the first and second radio devices.

2. The method according to claim 1, the method further comprising:
   determining that the first and second radio devices offer identical direct-link block lengths and determine in dependence on the cell indication that the first and second radio devices are located close enough for establishing a physical direct-link radio channel; and
   determining the instruction message for the first device to transmit data on the physical direct-link radio channel towards the second radio device.

3. The method according to claim 1, the method further comprising:
   determining a signalling path between the first and second radio device through a radio network infrastructure device;
   determining a further instruction message for the first and/or second radio device to transmit data via the signalling path; and
   transmitting the further instruction message to at least one of the first and second radio devices.

4. The method according to claim 3, the method further comprising:
   receiving a notification from the first or second radio device that the physical direct-link radio channel is malfunctioning;
   determining and transmitting the further instruction message to at least one of the first and second radio devices as a response to the notification.

5. The method according to claim 3, the method further comprising:
   determining an unavailable direct-link capability if it is determined that the first and second radio devices do not offer identical direct-link block lengths or if it is determined in dependence on the cell indication that the first and second radio devices are not located close enough for establishing the physical direct-link radio channel; and
   determine and transmit the further instruction message to at least one of the first and second radio devices if the unavailable direct-link capability is determined.

6. A management device for managing a cellular radio communications network, the management device comprising a processor, a memory and a network interface being configured to:
   receive a plurality of numerology capability indications from a plurality of radio devices, wherein a numerology capability indication comprises one or more direct-link block lengths being provided by the respective radio device for communicating via a physical direct-link radio channel;
   receive a plurality of cell indications, wherein the cell indication indicates in which radio cell the respective radio device is operating;
   determine an instruction message in dependence on the numerology indications of the first and second radio device and in dependence on the cell indication of the first and second radio device; and
   transmit the instruction message towards at least one of the first and second radio devices.

7. A method to operate a first radio device for operating in a cellular radio communications network, the method comprising:
   determining a numerology capability indication, the numerology capability indication comprising one or more direct-link block lengths being provided by the first radio device for communicating via a physical direct-link radio channel;

transmitting the numerology capability indication via a physical uplink radio channel to a management device;

determining data to be transmitted to a second radio device;

receiving an instruction message via a physical downlink radio channel from the management device, the instruction message having been determined by the management device; and transmitting the data towards the second radio device in dependence on the instruction message.

8. The method according to claim 7, wherein the instruction message comprises the instruction for the first device to transmit data via a physical direct-link radio channel with at least one of the direct-link block lengths towards the second radio device, the method further comprising:

modulating the data in dependence on an inverse Fast Fourier Transform of the at least one direct-link block length of the instruction message; and transmit the data towards the second radio device via the physical direct-link radio channel.

9. The method according to claim 7, the method further comprising:

receiving a further instruction message from the management device for the first device to transmit data via a signalling path between the first and second radio device through a radio network infrastructure device; and modulating the data in dependence on an inverse Fast Fourier Transform (IFFT) of an uplink block length; and transmit the data towards the second radio device via a physical uplink radio channel.

10. The method according to claim 7, the method further comprising:

determining a request for a data transmission to the second radio device;

transmitting the request via the physical uplink radio channel to the management device; and receiving the instruction message via a physical downlink radio channel from the management device as a response to the request.

11. A first radio device for operating in a cellular radio communications network, the first radio device comprising a processor, a memory and an antenna being configured to:

determine a numerology capability indication, the numerology capability indication comprising one or more direct-link block lengths being provided by the first radio device for communicating via a physical direct-link radio channel;

transmit the numerology capability indication via a physical uplink radio channel to a management device;

determine data to be transmitted to a second radio device;

receive an instruction message via a physical downlink radio channel from the management device, the instruction message having been determined by the management device; and transmit the data towards the second radio device in dependence on the instruction message.

12. A method to operate a second radio device for operating in a cellular radio communications network, the method comprising:

determine a numerology capability indication, the numerology capability indication comprising one or more direct-link block lengths being supported by the second radio device for communicating via a physical direct-link radio channel;

transmit the numerology capability indication via a physical uplink radio channel to a management device;

receive an instruction message via a physical downlink radio channel from a management device, the instruction message having been determined by the management device; and receive the data from the first radio device in dependence on the instruction message.

13. The method according to claim 12, wherein the instruction message comprises the instruction for the second device to receive data via a physical direct-link radio channel with the one or more direct-link block lengths from the first radio device, the method further comprising:

receive the data from the second radio device via the physical direct-link radio channel; and demodulating the data in dependence on a forward Fast Fourier Transform (FFT) of the direct-link block length of the instruction message.

14. The method according to claim 12, the method further comprising:

receive a further instruction message from the management device for the second device to receive data via a signalling path between the first and second radio device through a radio network infrastructure device;

receive the data from the first radio device via a physical downlink radio channel; and demodulate the data in dependence on a forward Fast Fourier Transform (FFT) of a downlink block length.

15. A second radio device for operating in a cellular radio communications network, the second radio device comprising a processor, a memory and an antenna being configured to:

determine a numerology capability indication, the numerology capability indication comprising one or more direct-link block lengths being supported by the second radio device for communicating via a physical direct-link radio channel;

transmit the numerology capability indication via a physical uplink radio channel to a management device;

receive an instruction message via a physical downlink radio channel from a management device, the instruction message having been determined by the management device; and receive the data from the first radio device in dependence on the instruction message.

\* \* \* \* \*